United States Patent [19]
Kataumi et al.

[11] Patent Number: 5,540,180
[45] Date of Patent: Jul. 30, 1996

[54] GEAR POSITION INDICATING ARRANGEMENT IN AUTOMATIC TRANSMISSION SHIFT CONTROL DEVICE

[75] Inventors: Yoshimasa Kataumi; Yasuyuki Ikegami, both of Kosai, Japan

[73] Assignee: Fuji Kiko Co., Ltd., Tokyo, Japan

[21] Appl. No.: 234,355

[22] Filed: Apr. 28, 1994

[30] Foreign Application Priority Data

Apr. 28, 1993 [JP] Japan .................. 5-022536 U

[51] Int. Cl.⁶ .................. B60K 41/26; B60K 20/00
[52] U.S. Cl. .................. 116/28.1; 192/4 A; 74/473 R
[58] Field of Search .................. 116/28.1, DIG. 20; 192/4 A; 74/473 R, 538, DIG. 7; 340/456

[56] References Cited

U.S. PATENT DOCUMENTS

| | | |
|---|---|---|
| 3,896,759 | 7/1975 | Ogura . |
| 3,929,092 | 12/1975 | Ogura . |
| 4,137,864 | 2/1979 | Lauper .................. 116/DIG. 20 |
| 4,798,160 | 1/1989 | Mochida et al. .................. 116/DIG. 20 |
| 4,884,668 | 12/1989 | Kobayashi et al. . |
| 4,909,096 | 3/1990 | Kobayashi . |
| 5,016,738 | 5/1991 | Shirahama et al. . |
| 5,372,051 | 12/1994 | Kanematsu et al. .................. 74/473 R |

FOREIGN PATENT DOCUMENTS

| | | |
|---|---|---|
| 0279087 | 8/1988 | European Pat. Off. . |
| 2424376 | 12/1974 | Germany . |
| 57-21780 | 5/1982 | Japan .................. 116/DIG. 20 |
| 60-035628 | 2/1985 | Japan . |
| 61-9334 | 1/1986 | Japan .................. 116/28.1 |
| 2-042503 | 11/1990 | Japan . |
| 3-064123 | 6/1991 | Japan . |

*Primary Examiner*—Christopher W. Fulton
*Assistant Examiner*—Andrew Hirshfeld
*Attorney, Agent, or Firm*—Foley & Lardner

[57] ABSTRACT

The invention provides a gear position indicating arrangement in an automatic transmission shift control device which makes it possible to obtain two kinds of devices, i.e., one for a right-hand drive vehicle and one for a left-hand drive vehicle, using a number of common parts. In the device, a base bracket is a common part and can be used for both of the kinds. An indicator cover to be installed on the base bracket can also be used for both of the kinds by reversing the front and rear ends thereof in case of a left-hand drive vehicle as compared with those in case of a right-hand drive vehicle. A bulb case is a part independent from the indicator cover and the base bracket and adapted to be fastened to a right-hand side of the base bracket in case of a right-hand drive vehicle and to a left-hand side of the base bracket in case of a left-hand drive vehicle.

23 Claims, 6 Drawing Sheets

GEAR POSITION INDICATING ARRANGEMENT IN AUTOMATIC TRANSMISSION SHIFT CONTROL DEVICE

BACKGROUND OF THE INVENTION

1. Field of the Invention

The present invention relates in general to an automatic transmission shift control device for automotive vehicles and more particularly to a gear position indicating arrangement in such an automatic transmission shift control device.

2. Description of the Prior Art

A kind of automatic transmission shift control device includes a base bracket fixedly attached to a vehicle body, a shift lever swingably or rotatably supported on the base bracket, the base bracket being formed with a hollow gate portion for allowing the swinging or rotation of the shift lever, and an indicator for indicating a selected gear position. The indicator is installed on the upper end of the base bracket whilst allowing the shift lever to extend upward therethrough.

The indicator consists of an indicator cover formed with an elongated opening through which the shift lever extends and an indicator window, a slide plate placed under the elongated opening and movable together with the shift lever, a dial panel fitted in the indicator window and having marks indicating respective gear positions, and a bulb case accommodating a light bulb for lighting up the dial panel.

Each mark on the dial panel consists of graduations corresponding to the gear positions or speed ranges and marks of letters of alphabet such as "P", "R", "D" and "L" and figures such as "1" and "2". The graduations are positioned at one side of the dial panel nearer to the shift lever.

Arrangements of the control button at the top end of the shift lever, the dial panel and the bulb case in a left-hand drive vehicle need be reversed as compared with those in a right-hand drive vehicle. For this reason, it has heretofore been practiced to manufacture two kinds of automatic transmission shift control devices independently and install them on the respective kinds of vehicles.

In the shift control device, irrespective of whether it is used in a right-hand drive vehicle or a left-hand drive vehicle, the shift lever in the "P" position is held nearly perpendicularly to the vehicle floor and is shifted therefrom into the respective gear positions through rearward rotation of predetermined select angles.

Such select angles are for example determined so as to be within the following ranges. An angle between the "P" position and the "R" position is within the range from 10 to 11 degrees. An angle between the "P" position and the "N" range is within the range from 15 to 16 degrees. An angle between the "P" position and the "D" position is within the range from 20 to 21 degrees. The elongated opening of the indicator cover through which the shift lever extends is usually so sized that an excess part of the elongated opening to be provided forwardly of the shift lever in the "P" position is different in length from an excess part of the elongated opening to be provided rearwardly of the shift lever in the "L" position, "1" position or "2" position.

The indicator cover for indicating the gear positions of the shift lever shiftable into the above described angular positions is not a flat plate but bent forwardly and rearwardly so as to be formed into a curved shape of a predetermined radius of curvature. This is because the shift lever is adapted to swing or rotate forwardly and rearwadly about a center fixed on the base bracket and the shift control device disposed within the passenger compartment is so designed with a view to improving the appearance.

The automatic transmission shift control device of the above described kind is disadvantageous since two kinds of shift control devices for use in a right-hand drive vehicle and a left-hand drive vehicle must be manufactured independently, i.e., there, are almost no common parts for manufacturing the two kinds of shift control devices, resulting a high cost.

SUMMARY OF THE INVENTION

According to an aspect of the present invention, there is provided an automatic transmission shift control device which comprises a base bracket in the form of a box and having a gate portion in the form of an elongated opening, a shift lever swingably supported on the base bracket and extending upward through the gate portion, an indicator cover installed on the base bracket and having an elongated opening through which the shift lever extends upward, and a bulb case positioned at one of opposite side walls of the base bracket so as to be covered by the indicator cover. The base bracket has a top end which is symmetrical with respect to a first plane, which intersects a straight line connecting between the fastening sections at the front and rear ends of the base bracket at a central point of the same and at right angles, and which is also symmetrical with respect to a second plane which is perpendicular to the first plane and which bisects the gate portion. The indicator cover has at front and rear ends thereof fastening sections matched with the fastening sections of the base bracket for thereby being fastened to the same. The indicator cover is symmetrical with respect to a third plane, which intersects a straight line connecting between the fastening sections at the front and rear ends of the indicator cover at a central point of the same and at right angles, and which is asymmetrical with respect to a fourth plane which is perpendicular to the third plane and which bisects the elongated opening of the indicator cover.

According to another aspect of the present invention, there is provided an automatic transmission shift control device for an automotive vehicle. The shift control device comprises a base bracket in the form of a box and having an adjacent top end gate portion which is curved in a front-to-rear direction thereof and formed with an elongated opening, a horizontal transverse shaft rotatably supported on the base bracket, a support member projecting radially of the horizontal shaft, a shift lever installed on the support member for swinging together therewith about an axis of the horizontal shaft and extending upward through the gate portion, and an indicator cover curved in a front-to-rear direction thereof installed on the upper end of the base bracket at a location above the gate portion and having an elongated opening through which the shift lever extends upward. The base bracket has a pair of guide portions of the same width on the opposite sides of the gate portion. The shift control device further comprises a bulb case attached to one side of the base bracket at a location under the indicator cover and adjacent to one of the guide portions. The base bracket has at front and rear ends thereof, fastening sections at which it is fastened to the indicator cover. The top end of the base bracket is curved in a front-to-rear direction thereof and symmetrical with respect to a first plane, which intersects a straight line connecting between the fastening sections at the front and rear ends of the base bracket at a central point of the same and at right angles, and which is also symmetrical with respect to a second plane which is perpendicular to the first plane and which bisects the gate portion. The indicator cover has at front and rear ends thereof fastening sections matched with the fastening sections of the base bracket, respectively. The indicator cover is symmetrical with respect to a third plane, which intersects a straight line connecting between the fastening sections at the front and rear ends of the indicator cover at a central point of the same and at right angles, and which is asymmetrical with respect to a fourth plane which is perpendicular to the third plane and which bisects the elongated opening of the indicator cover.

The above structures are effective for overcoming the above noted disadvantage inherent in the prior art device.

It is accordingly an object of the present invention to provide a novel and improved automatic transmission shift control device which makes it possible to obtain two kinds of devices, i.e., one for a right-hand drive vehicle and one for a left-hand drive vehicle, using a number of common parts and therefore can be manufactured at low cost.

DETAILED DESCRIPTION OF THE PREFERRED EMBODIMENTS

Figure 1:
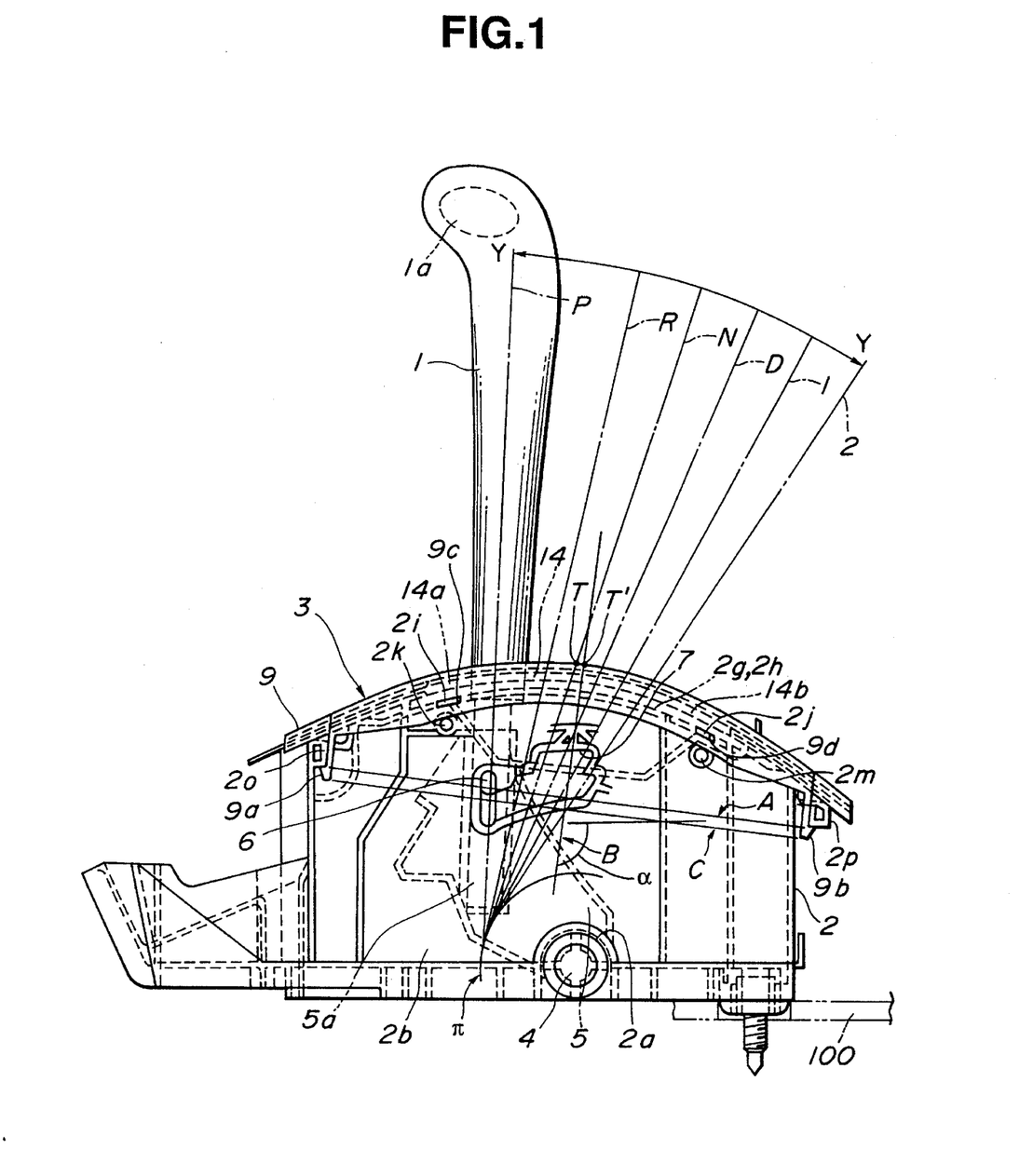
FIG. 1 is a side elevational view of an automatic transmission shift control device for a right-hand drive vehicle according to an embodiment of the present invention.
Figure 2:
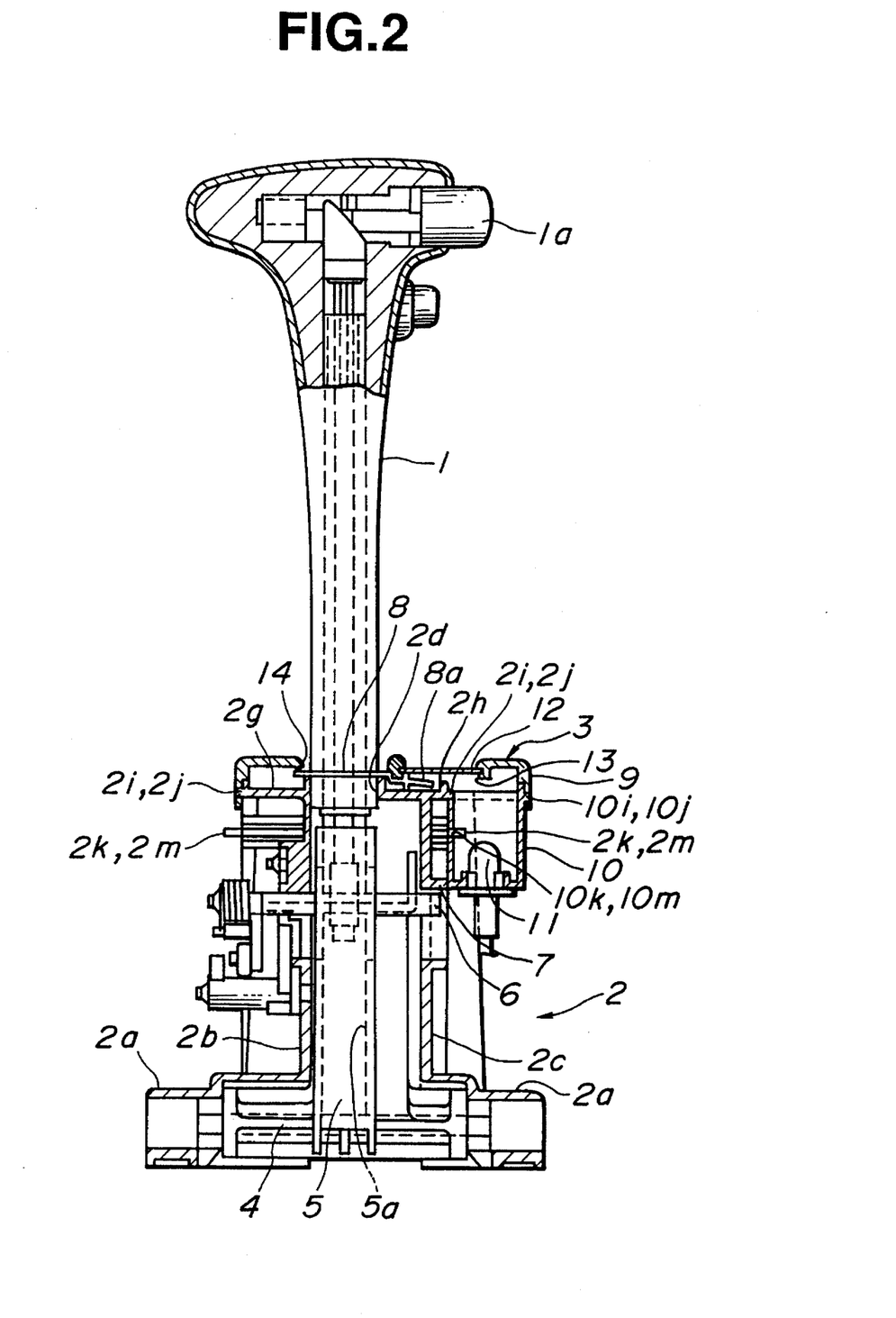
FIG. 2 is a front elevational partly sectioned view of the shift control device of FIG. 1.
Figure 3:
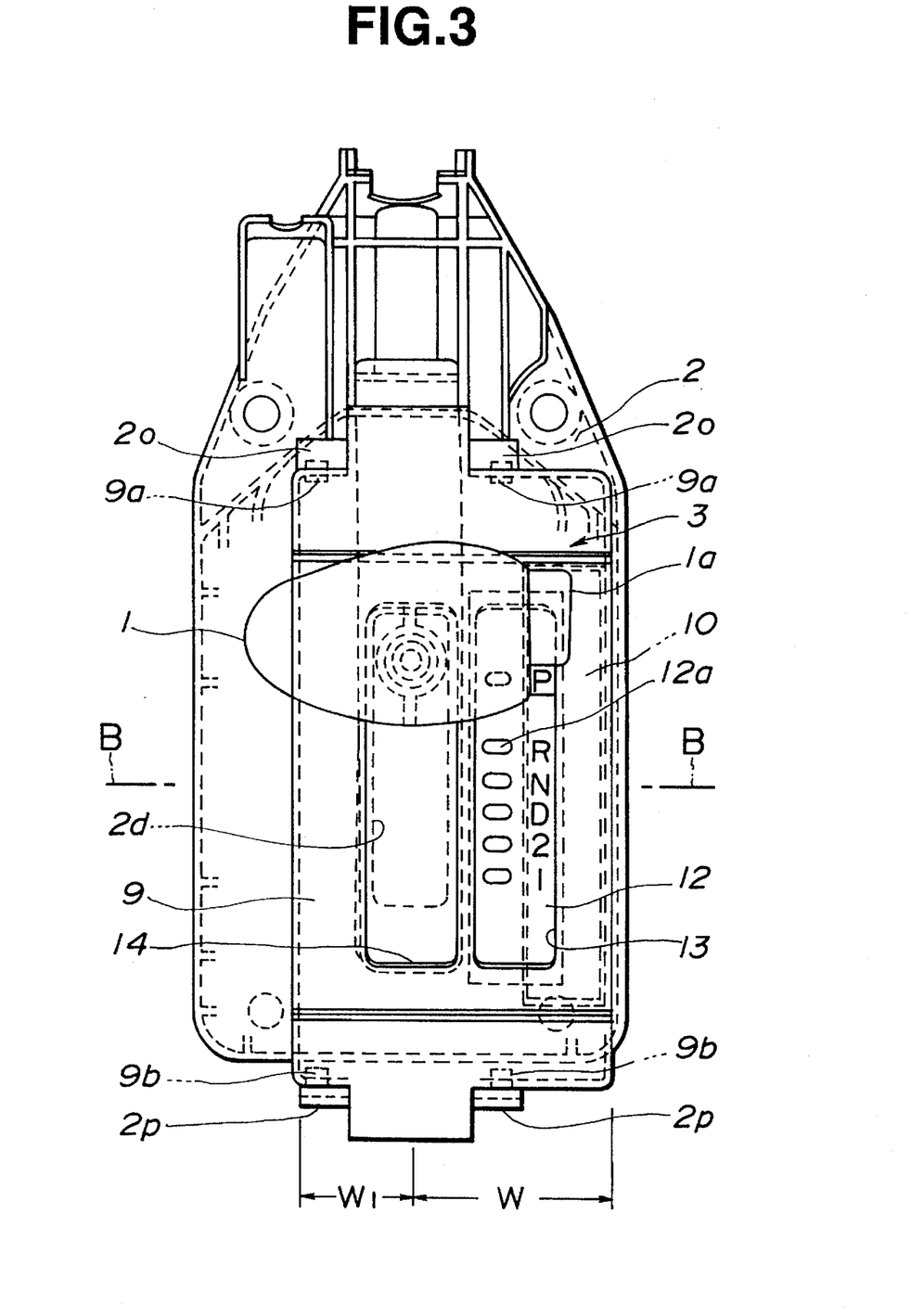
FIG. 3 is a plan view of the shift control device of FIG. 1.

Referring to FIGS. 1 to 3, a supporting arrangement fixedly attached to a vehicle body 100 and swingably or rotatably supporting a shift lever 1, consists of a box-like base bracket 2 made of a synthetic resinous material and an indicator 3 installed on and secured to the top end of the base bracket 2.

The shift lever 1 under an upright condition normally assumes a "P(parking)" position and can be inclined or tilted rearwardly, with a control button 1a at the top end of the shift lever 1 being pushed into an innermost position and held thereat, for thereby being moved sequentially into the respective gear positions such as a "R(reverse)" position, "N(neutral)" position, "D(drive)" position or "1(1st gear)" position. In this instance, the inclination angles of the shift lever corresponding to the respective gear positions are set substantially similarly to those in the prior art device, i.e., the inclination angle or select angle of the shift lever 1 between the "P" position and the "R" position is within the range from 10 to 11 degrees, between the "P" position and the "N" position is within the range from 15 to 16 degrees and between the "P" position and the "D" position is within the range from 20 to 21 degrees.

The base bracket 2 has at the bottom end portion thereof bearing portions 2a on which a transverse, horizontal shaft 4 is rotatably supported. The horizontal shaft 4 has an integral support 5 projecting radially forward and upward therefrom. The support 5 has an integral recessed or hollow support portion 5a in which the shift lever 1 is studded or fitted. The support 5 is made of a synthetic resinous material and has a generally flat, vertically extended plate-like shape. A position pin 6 is installed on the shift lever 1 and urged by a spring (not shown) against a detent cutoff portion 7 of the base bracket 2 so as to be held at a selected gear position. Similar arrangement regarding the position pin 6, the detent cutoff portion 7 and the control button 1a of the shift lever 1 is disclosed in U.S. Pat. Nos. 4,884,668, 4,909,096 and 5,016,738. In order that movement of the shift lever 1 into a selected gear position can be perceived assuredly by a driver, a check mechanism (not shown) is provided.

The shift lever 1 is arranged so that its axis, when it is in the "P" position, is tangential to a circle "π" of a predetermined radius and having a center coincident with the axis of the horizontal shaft 4 when observed in a side elevational view of FIG. 1. The shift lever 1 is movable from the "P" position (i.e., the position indicated by the tangent line "P") to the "2" position (i.e., the position indicated by the tangent line "2"), i.e., over the extent or range "Y—Y" as shown in FIG. 1. The middle or central point of the movable range "Y—Y" is coincident with the tangent line "N" where the shift lever 1 assumes the "N" position. Further, the excess length 14a of the elongated opening 14 of the indicator 3 provided on the forward side of the shift lever 1 in the "P" position is designed so as to be smaller than the excess length 14b of the elongated opening 14 provided on the rearward side of the shift lever 1 in a maximumly inclined position. Accordingly, the middle point of the elongated opening 14 does not coincide with the middle point of the movable range "Y—Y".

The base bracket 2 has integral side wall portions 2b and 2c which are respectively provided with the bearing portions 2a so that the support 5 is held between the side wall portions 2b and 2c, and is formed with, adjacent a top end thereof, a hollow, gate portion 2d which is curved forwardly and rearwardly. The gate portion is formed with an elongated opening for allowing swinging or rotation of the shift lever 1. The side walls 2b and 2c are formed with, at nearly the central portions thereof, the aforementioned detent cutoff portion 7. The upper edges of the side wall portions 2b and 2c are formed into an arcuated shape. The base bracket 2 further has guide portions 2g and 2h which are arranged symmetrically with respect to a plane which bisects the gate portion 2d along a longitudinally axis thereof. The guide portions 2g and 2h have a channel-like cross section and are of the same width and bent or curved forward and rearward.

A slide plate 8 is installed on the base bracket 2 at a location above the guide portions 2g and 2h in such a manner as to allow the shift lever 1 to extend upward therethrough and be slidable forward and rearward together with the shift lever 1 whilst closing an elongated opening 14 formed in the indicator cover 9. The base bracket 2 has, at the side walls of the guide portions 2g and 2h and adjacent the front and rear ends of the same, integral fastening sections 2i and 2j in the form of projections, respectively. At the side wall portions 2b and 2c and under the fastening sections 2i and 2j, the base bracket has fastening sections 2k and 2m in the form of projecting pins.

At respective front and rear end wall portions, the base bracket 2 has integral fastening sections 2o and 2p in the form of recesses or holes. A pair of such fastening sections 2o or 2p are provided at the left-hand and right-hand sides of each of the front and rear end wall portions, respectively. The center of the bent or curved upper face of the gate portion 2d is located on a plane "B" which intersects a straight line "A" connecting between the fastening sections 2o and 2p at a central point of the straight line "A" and at right angles.

Accordingly, the fastening sections 2o and 2p are located so as to be symmetrical with respect to the plane "B". The plane "B" is slanted so as to form a desired angle α with a horizontal floor surface of the vehicle body 100. The angle α varies depending upon variation of the design of a console box, the type of vehicle, etc.

The indicator 3 consists of the aforementioned slide plate 8, an indicator cover 9 placed on the top end of the base bracket 2 and fixedly attached to the same, a bulb case 10, a light bulb 11 accommodated within the bulb case 10 and a dial panel 12. The indicator cover 9 is formed with the aforementioned elongated opening 14 for allowing the shift lever 1 to extend upward therethrough whilst allowing the same to swing or rotate a predetermined angle relative thereto. The indicator cover 9 is further formed with a window 13, in which the dial panel 12 is installed and fitted, in parallel to the elongated opening 14. The bulb case 10 is positioned under the dial panel 12. The elongated opening 14 and the window 13 are each shaped so as to be symmetrical with respect to the plane "B".

The indicator cover 9 has, at the front and rear ends thereof, integral fastening sections 9a and 9b in the form of projections matched with the aforementioned fastening sections 2o and 2p of the base bracket 2, e.g., the fastening sections 9a and 9b and the fastening sections 2o and 2p are adapted to constitute snap fasteners for fastening the indicator cover 9 to the base bracket 2. The indicator cover 9 further has, at the opposite side portions thereof, fastening sections 9c and 9d in the form of recesses or holes. The fastening sections 9c and 9d at one side of the indicator cover 9 are matched with the fastening sections 2i and 2j.

The plane "B" intersects a straight line "C" connecting between the fastening sections 9a and 9b at a central point of the straight line "C" and at right angles. The fastening sections 9a and 9b and the fastening sections 9c and 9d are arranged symmetrically with respect to the plane "B" which is located adjacent to the central point of the curved or bent upper end face of the indicator cover 9. The fastening sections 9a and 9b and the fastening sections 9c and 9d are arranged also symmetrically with respect to a plane which bisects the gate portion 2d or the elongated opening 14 of the indicator cover 9 along a longitudinal axis thereof.

The indicator cover 9 is symmetrical with respect to the plane "B" but is not symmetrical with respect to a plane which bisects the elongated opening 14 along a longitudinal axis thereof since one half is of the width "W" so as to cover the bulb case 10 attached to one side wall portion 2c of the base bracket 2 and at the side of one guide portion 2h whilst the other half is of the width "W1" so as to cover only the other guide portion 2g.

The bulb case 10 is in the form an elongated box having at the top end thereof an opening which faces the window 13 and is prepared independently from the base bracket 2 and the indicator cover 9. The bulb case 10 has at one of opposite side walls thereof fastening sections 10k and 10m in the form of recesses or holes matched with the fastening sections 2k and 2m and at the other side wall thereof fastening sections 10i and 10j in the form of projections matched with the fastening sections 9c and 9d of the indicator cover 9. The light bulb 11 is installed in the bulb case 10 and stationarily held therewithin. By connecting the lamp 11 to a power source (not shown), the dial panel 12 is supplied with light on the lower surface thereof, whereby to make the graduations 12a of the dial panel 12 be bright and therefore clearly visible or recognizable.

Accoridingly, the point "T'" at which the aforementioned plane "B" intersect the upper end of the indicator cover 9 does not coincide, with respect to the side elevational of FIG. 1, with the point "T" at which the tangent line "N" intersect the upper surface of the indicator cover 9 but is located rearward of the point "T". Depending on the inclination angle α of the straight line A", it is determined whether the point "T'" is coincident with the point "T", displaced forward of the point "T'" or displaced rearward of the point "T'".

Thus, in the event of manufacture of an automatic transmission shift control device for a right-hand drive vehicle, the bulb case 10 is fastened to the right-hand side wall portion 2c of the base bracket 2 and at the side of the guide portion 2h through matching of the fastening sections 10k and 10m with the fastening sections 2k and 2m. At the same time, the bulb case 10 is covered by the indicator cover 9 and held by the same through matching of the fastening sections 10i and 10j with the fastening sections 9c and 9d. Further, the fastening sections 9a and 9b of the indicator cover 9 are matched with the fastening sections 2o and 2p of the base bracket 2. In the above manner, the indicator cover 9 and the bulb case 10 are installed on the base bracket 2.

The dial panel 12 is formed with graduations 12a for indicating respective gear positions or speed ranges (refer to FIG. 3) and marks of alphabets and figures at the side of the respective graduations 12a. The marks of alphabets and figures need be arranged on one side or the other of the dial panel 12 depending on the type of vehicle, i.e., a right-hand drive vehicle or a left-hand drive vehicle on which the shift control device is installed. Thus, in this embodiment, the dial panel 12 of the kind only for use in a right-hand drive vehicle is installed in the window 13. The shift lever 1 is also of the kind only for use in a right-hand drive vehicle, i.e., of the kind having the control button 1a protruding laterally rightward from the upper end of the shift lever 1.

Figure 4:
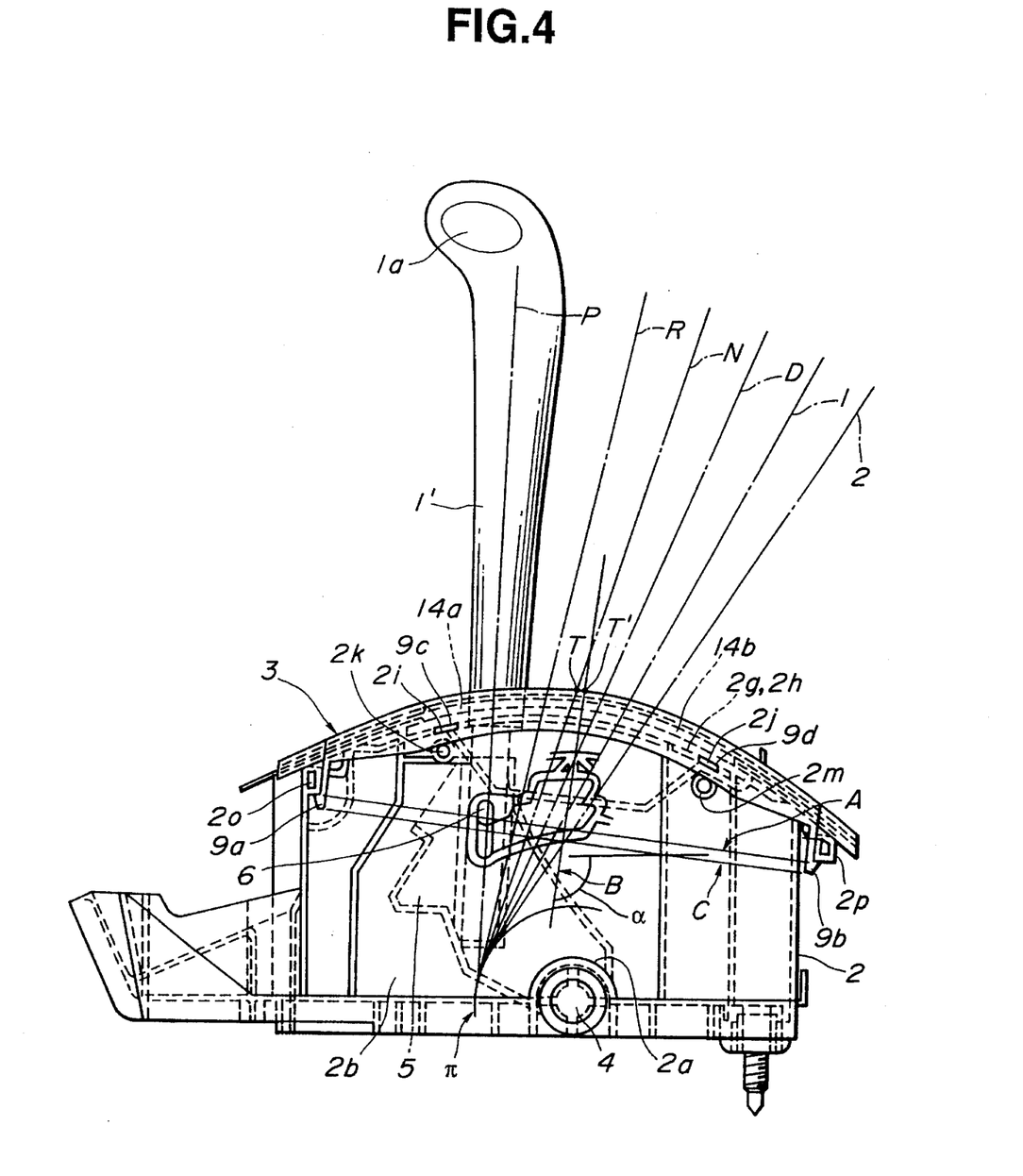
FIG. 4 is a side elevational view of an automatic transmission shift control device for a left-hand drive vehicle according to a further embodiment of the present invention.
Figure 5:
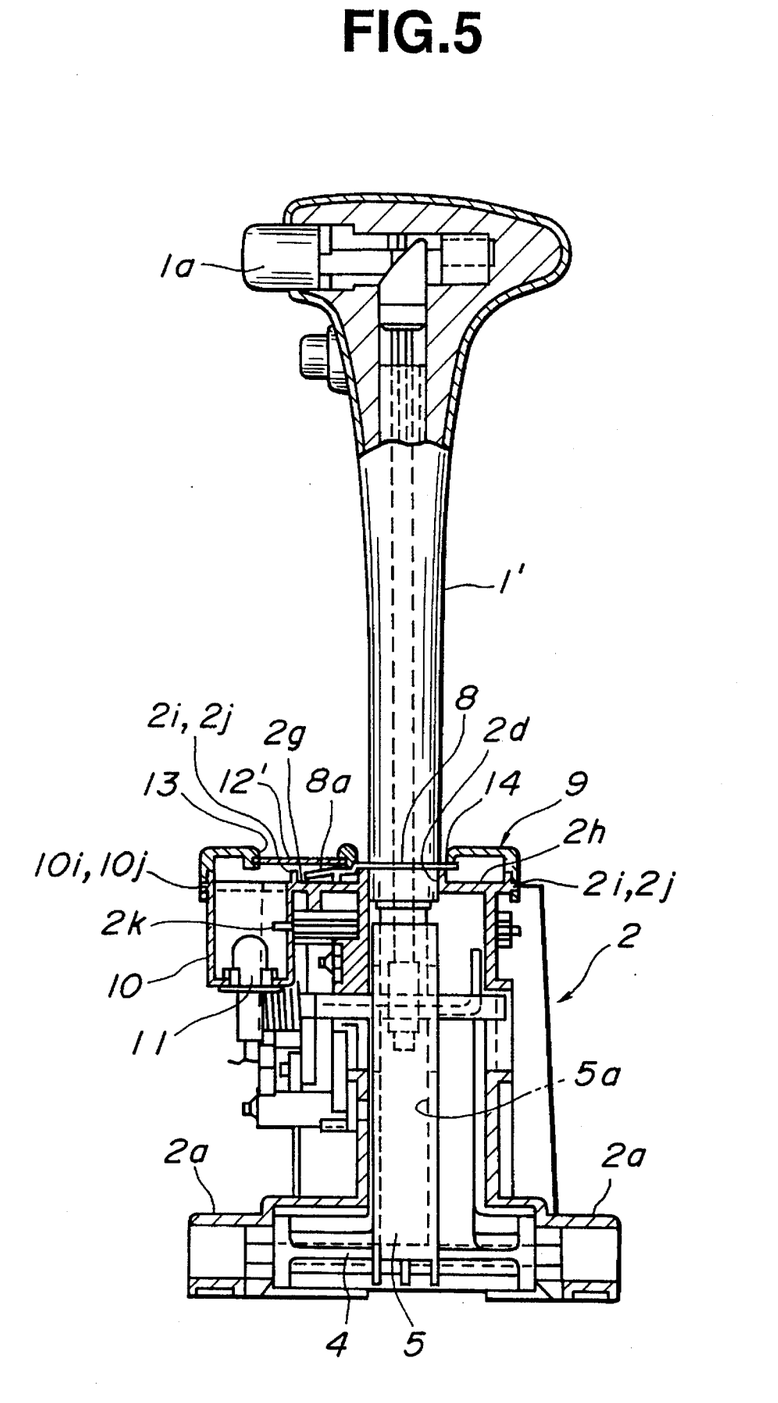
FIG. 5 is a front elevational partly sectioned view of the shift control device of FIG. 4.
Figure 6:
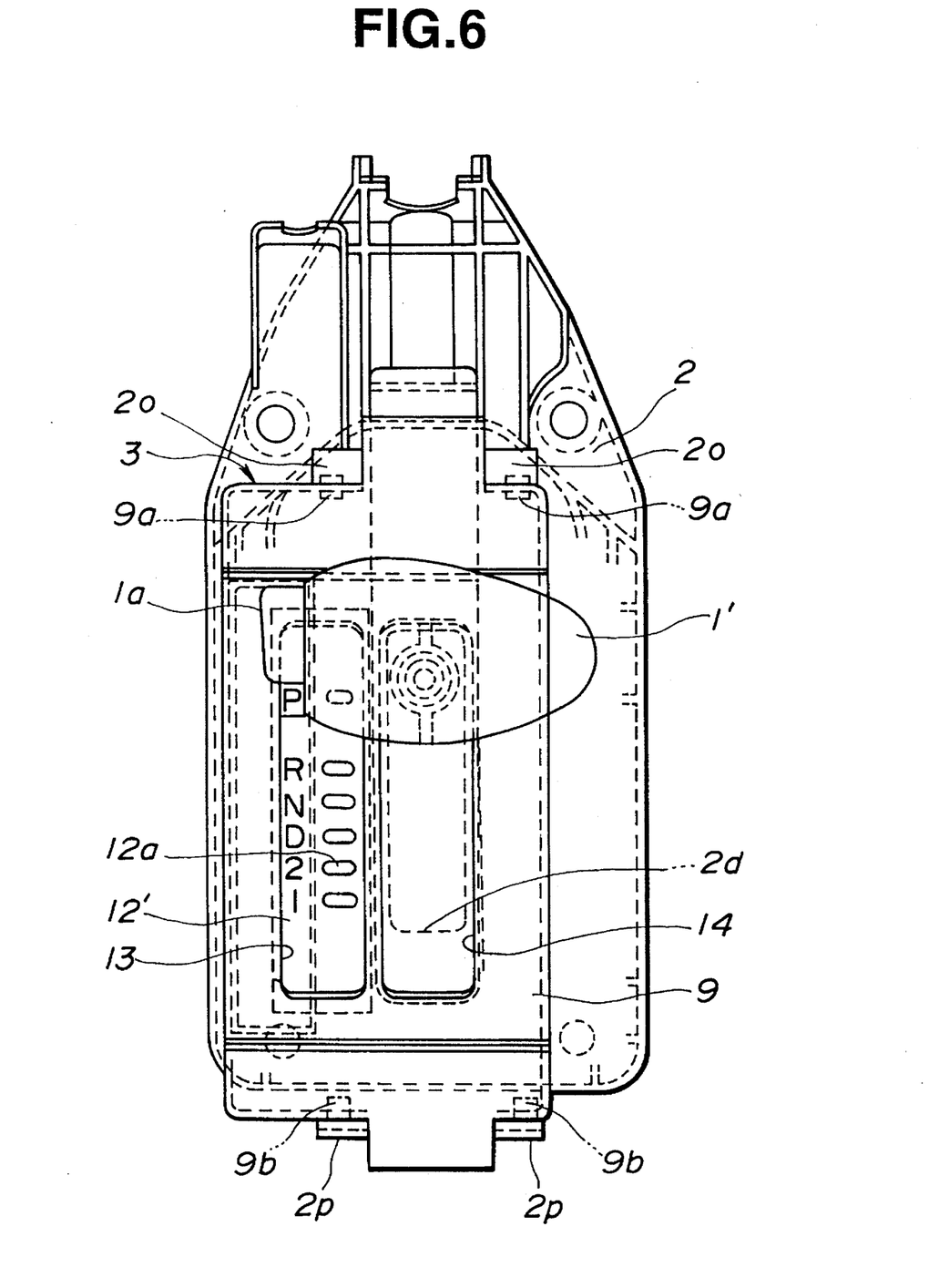
FIG. 6 is a plan view of the shift control device of FIG. 4.

In the event of manufacture of an automatic transmission shift control device for a left-hand drive vehicle, as shown in FIGS. 4 to 6, the bulb case 10 is attached to the other side wall portion (i.e., left-hand side wall portion in FIG. 5) 2b of the base bracket 2 and at the side of the other guide portion 2g through matching of the fastening sections 10k and 10m with the fastening sections 2k and 2m. At the same time, the bulb case 10 is covered by the indicator cover 9 and held thereby through matching of the fastening sections 10i and 10j with the fastening sections 9c and 9d. The fastening sections 9a and 9b are matched with the fastening sections 2o and 2p of the base bracket 2. In the above manner, the indicator cover 9 and the bulb case 10 are installed on the base bracket 2.

The indicator cover 9, in case of a left-hand drive vehicle, is arranged so as to have the front and rear ends which are reversed as compared with those in case of a right-hand drive vehicle. In the meantime, the shift lever 1' is of the kind having the control button 1a protruding laterally leftward from the top end thereof, i.e., of the kind only for use in a left-hand drive vehicle. The dial panel 12' is also of the kind only for use in a left-hand drive vehicle. The slide plate 8 is installed so as to have the front and rear ends which are reversed as compared with those in the right-hand drive vehicle.

From the foregoing, it will be understood that in the automatic transmission shift control device of this invention the guide portions of the base bracket are symmetrical with respect to a plane extending longitudinally of the vehicle body and a plane extending transversely of the same whilst the indicator cover installed on the guide portions is symmetrical with respect to a plane extending transversely of the vehicle body but asymmetrical with respect to a plane extending longitudinally of the vehicle body, whereby an automatic transmission shift control device for a left-hand drive vehicle can be obtained by attaching the bulb case to the opposite side of the guide portions as compared with that for a right-hand drive vehicle, attaching the indicator cover to the base bracket in such a manner that the front and rear ends thereof are reversed as compared with those for a right-hand drive vehicle and replacing the dial panel and the shift lever by those for a left-hand drive vehicle, thus making it possible to obtain an automatic transmission shift control device for a right-hand drive vehicle or for a left-hand drive vehicle with ease and efficiency through common use of many parts between them.

What is claimed is:

1. An automatic transmission shift control device, comprising:

a base bracket in the form of a box and having adjacent to a top end thereof a gate portion which is curved in a front-to-rear direction thereof and formed with an elongated opening;

a horizontal transverse shaft rotatably supported on said base bracket;

a support member projecting radially from said horizontal shaft;

a shift lever installed on said support member for swinging together therewith about an axis of said horizontal shaft and extending upward through said gate portion;

an indicator cover curved in a front-to-rear direction thereof and installed on said top end of said base bracket and having an elongated opening through which said shift lever extends upward;

a bulb case positioned at one of opposite side walls of said base bracket so as to be covered by said indicator cover;

first fastening means for fastening one of opposite sides of said bulb case to said one of said opposite side walls of said base bracket;

second fastening means for fastening an other of said opposite sides of said bulb case to one of opposite side walls of said indicator cover; and third fastening means for fastening an other of said opposite side walls of said indicator cover to an other of said opposite side walls of said base bracket, said top end of said base bracket being curved in a front-to-rear direction thereof and symmetrical with respect to a first plane, which intersects a straight line connecting between fastening sections at front and rear ends of said base bracket at a central point between said fastening sections and at right angles, said top end of said base bracket being also symmetrical with respect to a second plane which is perpendicular to said first plane and which bisects said gate portion, said indicator cover having at front and rear ends thereof fastening sections matched with said fastening sections of said base bracket for thereby being fastened to the base bracket, said indicator cover being symmetrical with respect to a third plane, which intersects a straight line connecting between said fastening sections at said front and rear ends of said indicator cover at a central point between said fastening sections of said indicator cover and at right angles, and which is asymmetrical with respect to a fourth plane which is perpendicular to said third plane and which bisects said elongated opening of said indicator cover.

2. An automatic transmission shift control device according to claim 1, wherein said straight line connecting between said fastening sections at said front and rear ends of said base bracket, inclines a predetermined angle relative to a horizontal plane.

3. An automatic transmission shift control device according to claim 1, wherein said first and third planes are coincident with each other, and said second and fourth planes are coincident with each other.

4. An automatic transmission shift control device according to claim 1, wherein said fastening sections of said base bracket and said indicator cover to be matched with each other constitute snap fasteners, respectively.

5. An automatic transmission shift control device according to claim 1, wherein said first fastening means comprises fastening sections provided to said one side of said bulb case and said one side wall of said base bracket, which constitute snap fasteners, respectively.

6. An automatic transmission shift control device according to claim 1, wherein said second fastening means comprises fastening sections provided to said other side of said bulb case and said one side wall of said indicator cover, which constitute snap fasteners, respectively.

7. An automatic transmission shift control device according to claim 1, wherein said third fastening means comprises fastening sections provided to said other side wall of said indicator cover and said other side wall of said base bracket, which constitute snap fasteners, respectively.

8. An automatic transmission shift control device for an automotive vehicle, comprising:

a base bracket in the form of a box and having adjacent to a top end thereof a gate portion which is curved in a front-to-rear direction thereof and formed with an elongated opening;

a horizontal transverse shaft rotatably supported on said base bracket;

a support member projecting radially from said horizontal shaft;

a shift lever installed on said support member for swinging together therewith about an axis of said horizontal shaft and extending upward through said gate portion;

an indicator cover curved in a front-to-rear direction thereof installed on said top end of said base bracket at a location above said gate portion and having an elongated opening through which said shift lever extends upward;

said base bracket having a pair of guide portions on opposite sides of said gate portion;

a bulb case attached to one side of said base bracket at a location under said indicator cover and adjacent to one of said guide portions;

first fastening means for fastening one of opposite sides of said bulb case to said one side of said base bracket;

second fastening means for fastening an other of said opposite sides of said bulb case to one of opposite side walls of said indicator cover; and third fastening means for fastening an other of said opposite side walls of said indicator cover to a side wall of another of said guide portions, said base bracket having at front and rear ends thereof fastening sections at which it is fastened to said indicator cover;

said top end of said base bracket being curved in a front-to-rear direction thereof and symmetrical with respect to a first plane, which intersects a straight line connecting between said fastening sections at said front and rear ends of said base bracket at a central point between said fastening sections of said base bracket and at right angles, and which is also symmetrical with respect to a second plane which is perpendicular to said first plane and which bisects said gate portion;

said indicator cover having at front and rear ends thereof fastening sections matched with said fastening sections of said base bracket, respectively;

said indicator cover being symmetrical with respect to a third plane, which intersects a straight line connecting between said fastening sections at said front and rear ends of said indicator cover at a central point between said fastening sections of said indicator cover and at right angles, and which is asymmetrical with respect to a fourth plane which is perpendicular to said third plane and which bisects said elongated opening of said indicator cover.

9. An automatic transmission shift control device according to claim 8, wherein said straight line connecting between said fastening sections at said front and rear ends of said base bracket, inclines a predetermined angle relative to a horizontal plane.

10. An automatic transmission shift control device according to claim 8, wherein said first and third planes coincide with each other, and said second and fourth planes coincide with each other.

11. An automatic transmission shift control device according to claim 8, wherein said fastening sections of said base bracket and said indicator cover to be matched with each other constitute snap fasteners, respectively.

12. An automatic transmission shift control device according to claim 8, wherein said first fastening means comprises fastening sections provided to said one side of said bulb case and said one side of said base bracket, which constitute snap fasteners, respectively.

13. An automatic transmission shift control device according to claim 8, wherein said second fastening means comprises fastening sections provided to said other side of said bulb case and said one side wall of said indicator cover, which constitute snap fasteners, respectively.

14. An automatic transmission shift control device according to claim 8, wherein said third fastening means comprises fastening sections provided to said other side wall of said indicator cover and said side wall of said other guide portion, which constitute snap fasteners, respectively.

15. An automatic transmission shift control device comprising:

a base bracket in the form of a box and having a gate portion in the form of an elongated opening;

a shift lever swingably supported on said base bracket and extending upward through said gate portion;

a horizontal transverse shaft rotatably supported on said base bracket;

a support member projecting radially from said horizontal shaft;

said shift lever being installed on said support member for swinging together therewith about an axis of said horizontal transverse shaft;

an indicator cover installed on said base bracket and having an elongated opening through which said shift lever extends upwards;

a bulb case positioned on one of opposite side walls of said base bracket so as to be covered by said indicator cover;

said base bracket having a pair of guide portions on opposite sides of said gate portion;

first fastening means for fastening one of opposite sides of said bulb case to said one of said opposite side walls of said base bracket adjacent to one of said guide portions;

second fastening means for fastening the other of said opposite sides of said bulb case to one of opposite side walls of said indicator cover; and third fastening means for fastening the other of said opposite side walls of said indicator cover to the other of said opposite side walls of said base bracket;

said base bracket having a top end which is symmetrical with respect to a first plane, which intersects a straight line connecting between fastening sections at front and rear ends of said base bracket at a central point between said fastening sections and at right angles, and which is also symmetrical with respect to a second plane which is perpendicular to said first plane and which bisects said gate portion;

said indicator cover having at front and rear ends thereof fastening sections matched with said fastening sections of said base bracket for thereby being fastened to each other;

said indicator cover being symmetrical with respect to a third plane, which intersects a straight line connecting between said fastening sections at said front and rear ends of said indicator cover at a central point between said fastening sections of said indicator cover and at right angles;

said top end of said base bracket being curved in a front-to-rear direction thereof;

said indicator cover being asymmetrical with respect to a fourth plane which is perpendicular to said third plane and which bisects said elongated opening of said indicator cover;

said indicator cover being positioned above said gate portion and said bulb case being positioned under said indicator cover and adjacent to said one of said guide portions; and said straight line connecting between said fastening sections at said front and rear ends of said base bracket, inclining a predetermined angle relative to a horizontal plane.

16. An automatic transmission shift control device according to claim 15, wherein said first and third planes are coincident with each other, and said second and fourth planes are coincident with each other.

17. An automatic transmission shift control device according to claim 16, wherein said fastening sections of said base bracket and said indicator cover to be matched with each other constitute snap fasteners, respectively.

18. An automatic transmission shift control device according to claim 15, wherein said third fastening means fasten the other of said opposite side walls of said indicator cover to a side wall of another of said guide portions.

19. An automatic transmission shift control device according to claim 18, wherein said first fastening means comprises fastening sections provided to said one side of said bulb case and said one side wall of said base bracket, which constitute snap fasteners, respectively.

20. An automatic transmission shift control device according to claim 19, wherein said second fastening means comprises fastening sections provided to said other side of said bulb case and said one side wall of said indicator cover, which constitute snap fasteners, respectively.

21. An automatic transmission shift control device according to claim 20, wherein said third fastening means comprises fastening sections provided to said other side wall of said indicator cover and said other side wall of said base bracket, which constitute snap fasteners, respectively.

22. An automatic transmission shift control device according to claim 20, wherein said third fastening means comprises fastening sections provided to said other side wall of said indicator cover and said side wall of another of said guide portions, which constitute snap fasteners, respectively.

23. An automatic transmission shift control device according to claim 22, wherein said base bracket is fixedly attached to a vehicle body.

* * * * *